United States Patent [19]
Bowerman

[11] 3,807,643
[45] Apr. 30, 1974

[54] MATERIAL AGITATOR FOR A SPREADER

[75] Inventor: Paul Lee Bowerman, Silver Lake, Ind.

[73] Assignee: The Cyclone Seeder Company, Inc., Urbana, Ind.

[22] Filed: Nov. 27, 1972

[21] Appl. No.: 309,629

[52] U.S. Cl. ............................. 239/683, 239/687
[51] Int. Cl. ........................................... A01c 17/00
[58] Field of Search ............ 248/221, 230; 239/683, 239/687

[56] References Cited
UNITED STATES PATENTS

| | | | |
|---|---|---|---|
| 3,374,956 | 3/1968 | Bazilli et al. | 239/683 |
| 2,882,060 | 4/1959 | Speicher | 239/683 X |
| 3,295,812 | 1/1967 | Schneider et al. | 248/230 X |
| 3,494,583 | 2/1970 | Parr | 248/221 |

Primary Examiner—Allen N. Knowles
Assistant Examiner—John J. Love
Attorney, Agent, or Firm—Oltsch & Knoblock

[57] ABSTRACT

An agitator for use in a fluent material spreader which includes a hopper having a bottom with a discharge opening therein and a rotatable shaft extending upwardly through the hopper bottom. The agitator is of a flat configuration which is connected to the shaft within the hopper for rotative movement therewith. The agitator is positioned so as to generally parallel the bottom of the hopper and has an opening formed therein which is positioned so as to pass over the discharge opening in the hopper during each revolution of the shaft.

7 Claims, 4 Drawing Figures

PATENTED APR 30 1974 3,807,643

MATERIAL AGITATOR FOR A SPREADER

SUMMARY OF THE INVENTION

This invention pertains to an agitator utilized in the hopper of a spreader.

The agitator of this invention is mounted to a rotatable shaft which extends upwardly into the hopper of the spreader. The agitator is of a flat configuration and is positioned so as to generally parallel the bottom of the hopper. The agitator includes an opening of sufficient size to accommodate the flow of grain therethrough. The agitator opening is preferably located so as to pass over the discharge opening in the bottom of the hopper during each revolution of the shaft to which the agitator is connected.

Heretofore agitators, such as the one shown in U. S. Pat. No. 3,175,739, utilized in spreaders for fluent material have been one-directional and of a construction so as to be detachable from the spreader only with some difficulty. The improved agitator of this invention is bi-directional, that is it can effectively work when rotated in either direction by its drive shaft, and additionally can be mounted, if desired, in an inverted position within the spreader hopper. The agitator can be constructed from flat sheet material and is of an economic and simplified design. The means for attaching the agitator to the rotatable drive shaft within the spreader hopper is of a simplified construction which enables the agitator to be connected to and disconnected from the spreader in a simplified manner without the need of hand tools.

Accordingly, it is an object of this invention to provide an agitator which is for a material spreader and which is of simplified design.

Another object of this invention is to provide an agitator which is for use in a material spreader and which is of an economic construction and which can be connected to and disconnected from the spreader in a simple and rapid manner without the need of hand tools.

Still another object of this invention is to provide an agitator for a material spreader which is bi-directional and of efficient operation.

Other objects of this invention will become apparent upon a reading of the invention's description.

BRIEF DESCRIPTION OF THE DRAWING

A preferred embodiment of this invention has been chosen for purposes of illustration and description wherein.

DESCRIPTION OF THE PREFERRED EMBODIMENT

The preferred embodiment illustrated is not intended to be exhaustive or to limit the invention to the precise form disclosed. It is chosen and described in order to explain the invention and its application and practical use to thereby enable others skilled in the art to best utilize the invention.

Figure 1:
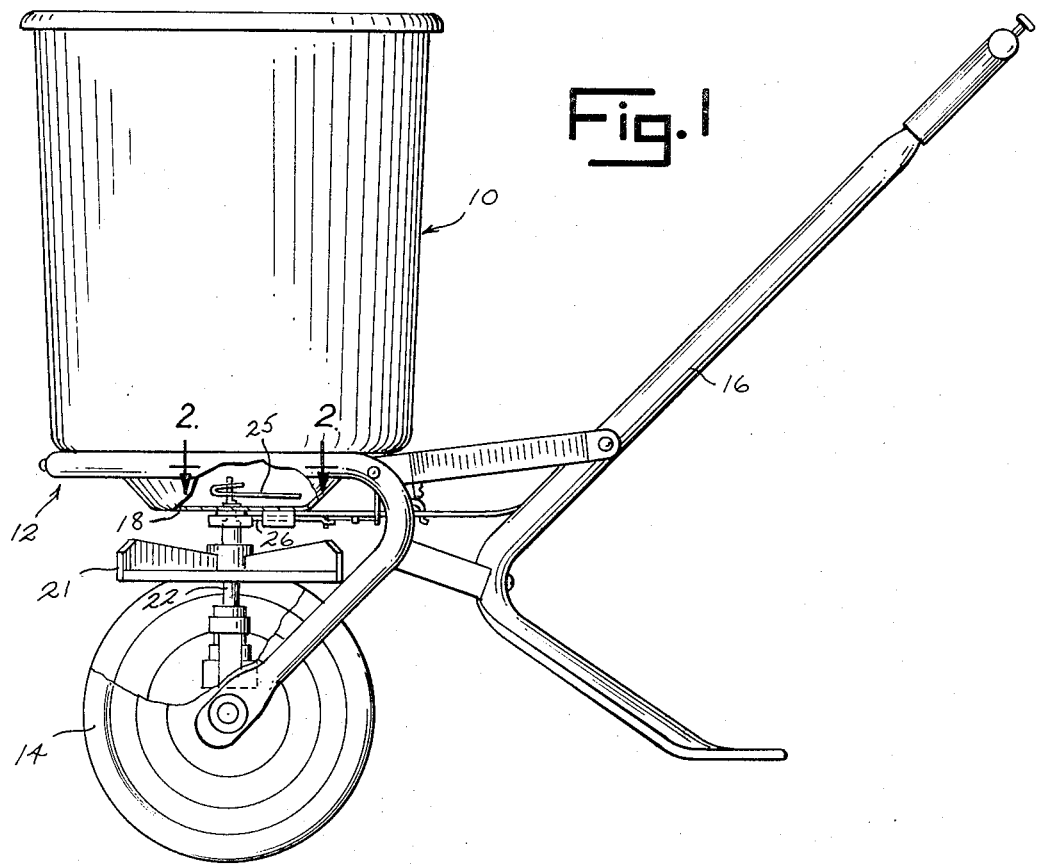
FIG. 1 is a side view of a spreader having portions of its component parts broken away for the purpose of showing the agitator of this invention.

The spreader illustrated in FIG. 1 is of a known construction and includes a hopper 10 supported upon a frame 12. Frame 12 is carried upon a spaced wheel and axle assembly 14 and includes a handle 16 by which the spreader can be pushed. It is to be understood that in some constructions of the spreader a tongue could be substituted for handle 16 so as to enable the spreader to be pulled by suitable power means. Hopper 10 includes a bottom wall 18 having a fluent material discharge opening 20 formed therein. An impeller 21 utilized to distribute the fluent material flowing downwardly through opening 20 in hopper 10 is positioned under the hopper opening and is fixedly carried upon a generally vertically oriented shaft 22. The lower end of shaft 22 is geared to wheel and exle assembly 14 so that upon rotation of the wheels of the assembly the shaft will be rotated, causing rotation of impeller 21. The upper end 23 of shaft 22 protrudes upwardly through an opening 24 in hopper bottom wall 18 and is journaled within the bottom wall. A metering device 26 is positioned directly under material discharge opening 20 in the bottom wall and serves to regulate the grain flow from the hopper onto impeller 21.

Figure 4:
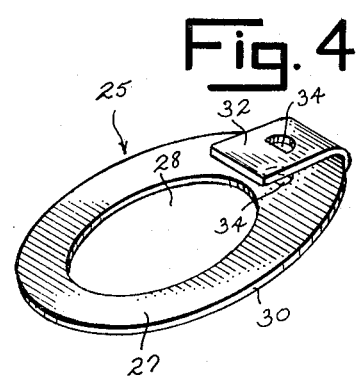
FIG. 4 is a perspective view of the agitator shown disconnected from the spreader.
Figure 2:
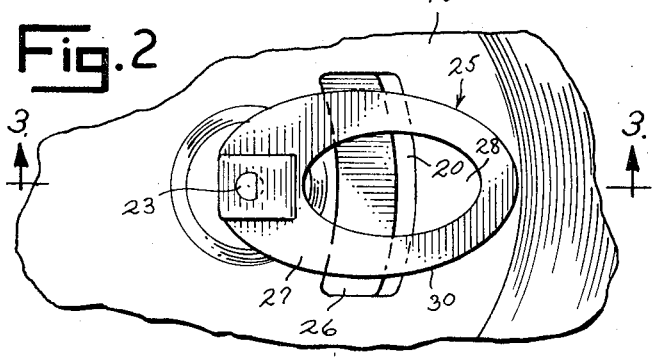
FIG. 2 is a fragmentary plan view of the agitator as seen from line 2—2 of FIG. 1.

Agitator 25, which forms the subject matter of this invention, is secured to end 23 of shaft 22 within hopper 10. Agitator 25 includes a blade part 27 which is of a flat configuration and which is preferably oval in shape. An opening 28 is formed in blade part 27. Opening 28 is preferably wholly contained within the outer periphery of the agitator blade part and is of a size large enough to permit material flow through the opening as the fluent material flows downwardly in the hopper and out through discharge opening 20. As best seen in FIGS. 2 and 4, opening 28 in the blade part of agitator 25 is preferably also oval in shape and has an area which is at least one-fourth of the total area bounded by the peripheral edge 30 of the blade part.

Figure 3:
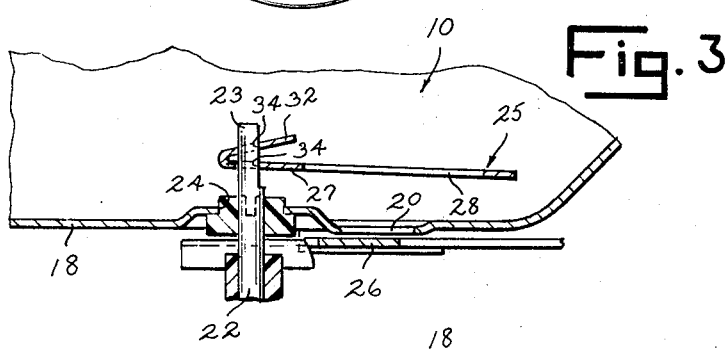
FIG. 3 is a sectional view taken along line 3—3 of FIG. 2.

Agitator 25 includes an integral tab 32 which is formed at one end of blade part 27 and which is bent so as to spacedly overlie the blade part at a portion thereof uninterrupted by opening 28. Agitator 25 is constructed of a type of material which enables tab 32 to be flexed from the inclined position shown in the figures to a position generally paralleling the agitator blade part 27. One type of material suitable for agitator 25 is a spring steel having a sheet thickness of 0.005 to 0.010 inches. Tab 32 and agitator blade 27 have openings 34 formed therein which when the tab is flexed into a generally parallel position with the blade part are brought into alignment. Upper end 23 of shaft 22 has a non-circular cross section which is complemental in shape to openings 34 in agitator 25. Openings 34 are slightly larger in size than shaft end 23 so as to enable the shaft to be received within openings 34 when tab 32 is flexed inwardly toward blade part 27 of the agitator to bring the openings into alignment. Once end 23 of the shaft is received within openings 34, tab 32 is released so that it springs into its inclined position shown in FIG. 3, thereby causing openings 34 to be slightly misaligned and the tab and blade part to interlock with the shaft end.

The length of agitator blade part 27 is preferably such that when the agitator is secured to end 23 of shaft 22 the blade part will overlie opening 20 in bottom wall 18 of hopper 10 with opening 23 being positioned over opening 20 in the hopper bottom wall at one time during each revolution of shaft 22.

Agitator 25 can be connected to and disconnected from shaft 22 merely by flexing tab 32. While it is preferable to attach agitator 25 to shaft 22 with tab 32 being uppermost, it is to be understood that the agitator can be inverted or turned over and attached to the shaft with the tab being positioned beneath blade part 27. Agitator 25 may be rotated in either direction with its leading edge producing a minimum of drag. Opening 28 in the agitator is designed so as to minimize resistance to the flow of the fluent material past the agitator and down through opening 20 in the hopper.

It is to be understood that the invention is not to be limited to the details herein given but may be modified within the scope of the appended claims.

What I claim is:

1. In a spreader for fluent material, said spreader including a hopper, said hopper including a bottom having a discharge opening therein, a rotatable shaft extending upwardly through said bottom into said hopper, an agitator comprising a flat blade having a peripheral edge and opening means located entirely within said peripheral edge to accommodate the passage of said material through said blade, securement means carried by said blade and connecting said blade to said shaft within said hopper in a position generally paralleling said hopper bottom for rotative movement with said shaft, said blade projecting laterally from said shaft, said opening means being laterally spaced from said shaft and positioned relative to said shaft and said discharge opening so as to pass over said discharge opening at least once during each revolution of said shaft.

2. The agitator of claim 1 wherein said peripheral edge is continuously arcuate.

3. The agitator of claim 1 wherein said peripheral edge is oval.

4. The agitator of claim 1 wherein said opening means is of an oval shape and has an area of at least one-fourth of the over all area of said blade as defined by said peripheral edge.

5. The agitator of claim 1 wherein said securement means includes a tab flexibly connected at one edge to said blade part and bent thereover, said tab being normally angled relative to said blade part, said tab and blade part having openings therein, said tab and blade part openings being aligned to receive said shaft when said tab is flexed to generally parallel said blade part, said tab and blade part openings being misaligned to cause said tab and blade part to lockingly engage said shaft when said tab is so angled relative to said blade part.

6. The agitator of claim 1 wherein said tab and blade openings are non-circular, said shaft being complemental in cross section to said tab and blade openings.

7. The agitator of claim 5 wherein said tab is laterally spaced from said opening means.

* * * * *